United States Patent Office 3,567,810
Patented Mar. 2, 1971

3,567,810
PROCESS FOR MAKING HIGH-FLOW
ANISOTROPIC MEMBRANES
Richard W. Baker, Cambridge, Mass., assignor to
Amicon Corporation, Lexington, Mass.
No Drawing. Filed Apr. 1, 1968, Ser. No. 717,899
Int. Cl. B29d 27/04
U.S. Cl. 264—41                                    4 Claims

ABSTRACT OF THE DISCLOSURE

This invention relates to a novel process for forming improved polymeric anisotropic membranes comprising the additional step of subjecting a cast polymer film suitable for formation of such an anisotropic membrane to an evaporation step prior to precipitation of the membrane, said evaporative step controlled to selectively evaporate solvent from the surface of said film and thereby selectively increase the polymer concentration at the surface of said film. The improved membranes formed by the process of the instant invention are characterized by improved rejection characteristics while retaining liquid flux characteristics which are surprisingly high in view of the rejection characteristics.

BACKGROUND OF THE INVENTION

This invention relates to membranes useful in such separation processes as ultrafiltration and reverse osmosis.

Ultrafiltration is a process of separation whereby a solution containing a solute of molecular dimensions, significantly greater than the molecular dimensions of the solvent in which it is dissolved, is depleted of the solute by being subject to such pressure that the solvent is forced to flow through a membrane. "Ultrafiltration" is the term preferably used to describe such pressure-activated separations involving solutions of solutes of from about 500 molecular weight and above; the term is also conveniently used for processes involving, instead of dissolved molecules, colloidal-sized particles. "Reverse Osmosis" is a term conveniently reserved for membrane-separation processes wherein smaller molecules are involved, for example those molecules or solids which are of a size within one order of magnitude of those of the solvent.

The particular advantage of such membrane-modulated separation processes as described above lies in their potential speed, mild operating conditions and low operating cost compared to various other separation processes such as evaporation, dialysis, ultracentrifugation, chemical precipitation, and the like. These advantages become especially critical when thermally unstable or biologically active materials are to be processed or when relatively large volumes of solvent are present in a solution to be processed.

Successful membrane-modulated separation processess depend, in major part, upon the characteristics of the membrane utilized. Among the desired characteristics are:

(I) High hydraulic permeability to solvent: The membrane must be capable of transmitting liquid at high rates per unit membrane area under modest pressures.

(II) Sharp "Retention-Cut-Off": The membrane should be capable of retaining completely, or very nearly completely, all solutes of a molecular weight (or size) above some first specified value and of allowing the passage of all solutes of a molecular weight (or size) below some second value which should be as close as possible to the aforesaid first value.

(III) Good mechanical durability under the chemical and thermal conditions of service. Most preferably, a membrane should be suitable for use in a wide range of chemical and thermal environments.

(IV) A minimum dependence of solvent permeability upon the type of concentration of solute.

(V) High fouling resistance.

Two basic membrane-type filters have been available.

One type has an isotropic, sometimes called homogeneous, structure whose flow and retention properties are independent of flow direction. Such structures are typically produced in the form of sheets of from 0.1 to 0.010 inch in thickness. Such membranes are analogous to conventional filters and are virtually non-retentive for solutes of molecular weight under about one million. When attempts are made to prepare such membranes having a capability of retaining such smaller molecules, large decreases in hydraulic permeability occur. Such decreases result in too-low solvent flow rates through the membrane or restrict the usage of these isotropic membranes to very few, if any, practical applications. Moreover, such isotropic membranes are susceptible to relatively easy plugging by trapped solutes. The term isotropic here is not used to suggest a completely uniform pore structure, but only to indicate that the degree of anisotropy, where it exists, is very small when compared to the anisotropy of membranes of the membranes to be described below.

Still another type of membrane used in ultrafiltration processes is the diffusive-type filter. In these filters, the solvent is transported by molecular diffusion under the action of a concentration or activity gradient. They differ from the aforesaid, filter-like, microporous membranes in that the migration of a solvent molecule from one location to another across the membrane depends substantially on the availability of a series of sites between the polymer matrix for molecules being transported. This is an activated process. The mass-transfer capabilities of such membranes are therefore highly temperature-dependent. Such membranes contain few, if any, pores and are not suitable for the achievement of high flow rates. This is true even when these membranes are in the form of anisotropic membranes having a very thin barrier layer. Thus they do not find utility in large-volume industrial applications. Moreover, the polymeric material from which such membranes are formed must have a high sorptivity for the solvent being transferred. One example is cellulose acetate which absorbs 15–20% of water and has found some utility in such diffusion-membrane separation processes as described in this paragraph.

Recently, and as disclosed in commonly owned and copending U.S. Ser. No. 669,648 filed Sept. 21, 1967 by Alan S. Michaels, now abandoned and replaced by continuation-in-part Ser. No. 755,320 filed Aug. 26, 1968 highly anisotropic, submicroscopically porous, membranes have been formed of polymers having good mechanical integrity, most advantageously those crystalline and/or glassy thermoplastic polymers known to the art. By crystalline and glassy polymers are meant those materials which possess from about 5 to 50% by weight crystallinity as measured by X-ray diffraction techniques known to the art and/or a glass transition temperature (Tg) of at least about 20° C. Particularly advantageous are polymers of inherently low water sorptivity, which unlike the cellulose acetate materials known to the membrane art may be allowed to dry during storage without losing all of their beneficial structural characteristic. These polymers are those having water-absorptivities of less than about 10% by weight of moisture at 25° C. and 100% relative humidity.

The submicroscopically porous anisotropic membranes disclosed in the copending application consist of a macroscopically thick film of porous polymer, usually more than about 0.002 and less than about 0.050 of an inch in thickness. One surface of this film is an exceedingly thin, but relatively dense barrier layer of "skin" of from about 0.1 to 5.0 microns thickness of microporous polymer in which the average pore diameter is in the millimicron range, for example from 1.0 to 1000 millimicrons—i.e., about one-tenth to one hundredth the thickness of the skin. The balance of the film structure is a support layer comprised of a much more coarsely porous polymer structure through which fluid can pass with little hydraulic resistance. When such a membrane is employed as a "molecular filter" with the "skin-side" in contact with fluid under pressure, virtually all resistance to fluid flow through the membrane is encountered in the "skin," and molecules or particles of dimensions larger than the pores in the "skin" are selectively retained. Because the skin layer is of such extraordinary thinness, the over-all hydraulic resistance to fluid flow through the membrane is very low; that is, the membrane displays surprisingly high permeability to fluids. Furthermore, tendency of such membranes to become plugged or foulded by molecules or particles is surprisingly low.

Such highly anisotropic membranes are suitably prepared by:

(1) Forming a casting dope of a polymer in an organic solvent (2) Casting a film of said casting dope (3) Preferentially contacting one side of said film with a diluent characterized by a high degree of miscibility with said organic solvent and a sufficiently low degree of compatibility with said polymer to effect rapid precipitation of said polymer, and (4) Maintaining said diluent in contact with said membrane until substantially all said solvent has been replaced with said diluent.

The degree of anisotropy in the membrane structure is critical to achieving the desired high fluid flow characteristics while maintaining the ability to recheck high proportions of solute molecules. That is to say that the thinner the barrier skin is and the more distinct the boundary between the barrier skin and the macroporous support layer of the membrane, the higher the performance characteristics possessed by the membrane.

SUMMARY OF THE INVENTION

Thus it is a principal object of the present invention to provide a process whereby the degree of anisotropy achievable in polymeric membranes is markedly increased.

It is a further object of the invention to produce anisotropic polymeric membranes having improved rejection characteristics.

Other objects of the invention will be obvious to those skilled in the art on reading this specification.

These objects have been achieved by subjecting the films of cast polymer solution to a forced evaporation step before the films are submerged in the precipitating bath wherein the membrane itself is formed.

The evaporative step must be carried out at a relatively rapid rate so that the increase in solution concentration is preferentially selective at the exposed face of the cast film, i.e., the face on which the thin barrier skin is to be formed. In order to achieve this rapid evaporation most conveniently, it has been found that exposure of the cast film to an elevated temperature 50° C. to 250° C., is the preferred procedure.

This temperature is preferably selected to be as high as practical for manipulation of the membranes subjected thereto, but in no case so high as to cause disruption of the film by bubbling or other such secondary effects.

Other means of evaporating and thereby increasing the polymer concentration of the exposed face of the cast film can also be employed. These include such procedures as (a) Cooling the casting below room temperature and then subjecting the face thereof to a reduced pressure so that the solvent medium tends to evaporate. In this situation diffusion of polymer toward the face of the casting is retarded because of the reduced viscosity of the film mass tends to retard solvent diffusion toward the surface of the membrane and (b) Cooling as in (a) above then causing a drying as (which could be air, for example) to blow gently across the face of the membrane (c) Subjecting the cast film to a vacuum and (d) Subjecting the cast film to a vacuum at an elevated temperature.

Among some of the more advantageous thermoplastic polymers useful in the process of the invention are the polysulfone type polymers including that sold under the trade name P 1700 by Union Carbide Corporation and that sold under the trade name Polymer 360 by 3M Company. The former has a chain phenyl groups alternating with phenyl-linking groups, to wit:

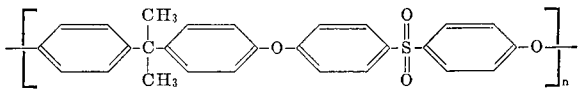

The latter has diphenyl and phenyl units linked by sulfone and oxygen units and an inherent viscosity of about 0.46 in a 1% solution of dimethyl formamide.

ILLUSTRATIVE AND GENERAL PROCEDURE

The following general procedure was used to form membranes according to the invention. The specific details relating to the specific formulations and to the testing of each membrane is set forth in the various tables.

The polymer is dissolved in the chosen solvent, conveniently at temperatures of about 50 to 80° C. but at higher temperatures where the solubility of the material requires and where the volatility of the solvent permits.

A film of the resulting solution, conveniently of from 10 to 12 mils in thickness or as otherwise indicated, is drawn with a Gardner drawdown bar onto a glass plate. The perimeter of the plate is taped and the edges of the drawn film extend over the tape. The solution permeates the tape slightly anchoring the film thereto, thereby providing means for avoiding liquid seeping under the film during the subsequent washing, or precipitation, step.

The film is allowed to stand for a minute to smooth out any irregularities introduced during drawdown. After this, the membrane is subject to the forced evaporative step by placement in an oven or other environment conducive to increasing the normal evaporation rate of solvent from the membrane surface. Then the film is immersed in water at 25° C. for a period of 15 minutes, after which a membrane is removed from the glass plate and cut into a suitable desired shape.

"DMAC" is used to designate the solvent dimethylacetamide. "DMSO" is used to designate the solvent dimethylsulfoxide.

SPECIFIC WORKING EXAMPLES

In the following specific working examples, the term "water flux" is the amount of distilled water (gallons per square foot per day) that can be transmitted through the membrane at 25° C. and under a 50 p.s.i.g. operating pressure. The rate is measured after a 20-minute stabilization period. Flux rates for ultrafiltration from 1% polysaccharide solutions are given in the same units. All flux data is obtained in well-stirred batch cells of the type known to the art and available from Amicon Corporation under the trade designation Diaflo Model 50. These rates are taken over a period of a few minutes after a 20 minute stabilization with distilled water. The membranes are, in each case, prepared from 12 mil drawdowns of the polymer-solvent solution which were cast at room temperature, subjected to the evaporative step, and precipitated in a water bath.

Table A demonstrates the increase in rejection capabilities of Polymer 360 membrane when an evaporative step is carried out in a dry box at about 28° C. for the indicated times. Note that this increase in rejection capability, although significant, is achieved at the cost of considerable reduction in volume of ultrafiltrate produced:

provements obtained by an evaporation step carried out at 180° C. for 10 seconds:

TABLE C.—RESULTS OBTAINED ON HEAT TREATING CAST FILMS IN AIR OVEN FOR 10 SECONDS AT 180° C.

| Casting solution | Water flux | Pressure (p.s.i.) | Flux | Rejection (percent) |
|---|---|---|---|---|
| | | Dextran 20 rejection | | |
| 15 g. Polymer 360, in 55 cc. DMSO, and 45 cc. acetone. | 140 | 10 | 14.2 | 94 |
| | | 25 | 17.6 | 86 |
| | | 50 | 28.4 | |
| | | Dextran 10 rejection | | |
| Do | 140 | 10 | 21.2 | 88 |
| | | 25 | 39.0 | 76 |
| | | 50 | 42.4 | 76 |
| Do [1] | 320 | No rejection to Dextran 10 or Dextran 20. | | |

[1] Control-no heating.

TABLE A.—MODERATE-RATE EVAPORATION

| Casting solution composition | Membrane thickness (mils) | Water flux | Rejection of 110,000 molecular wt. polysaccharide | | | Remarks |
|---|---|---|---|---|---|---|
| | | | Pressure (p.s.i.) | Flux | Rejection percent | |
| 15 g. Polymer 360, 55 cc. DMSO, 45 cc. acetone. | 4.7 | 70 | 25 | 7.0 | 100 | 5 min. in dry box. |
| | | | 50 | 7.0 | 91 | |
| Do | 3.6 | 320 | 10 | 10.6 | 86 | Control, no exposure to dry box. |
| | | | 25 | 17.6 | 68 | |
| | | | 50 | 25.0 | 52 | |

Table B demonstrates the increase in rejection capabilities of Polymer 360 membrane when a relatively high-rate evaporating step is carried out in an air-circulation oven at 90° C. Note that this more rapid evaporation also results in excellent gains in rejection characteristics but does not result in as great losses in membrane throughput during ultrafiltration. This is believed to be due to the fact that the faster evaporation rate allows achievement of a considerably increased difference between the rate of loss of solvent from the membrane surface on which the barrier skin is to form and the loss to this surface by diffusion of solvent from underlying portions of the cast film and thereby allows formation of a tighter but also thinner barrier skin.

Dextran 10 is a trade designation for a 10,000 molecular weight polysaccharide.

Dextran 20 is a trade designation for a 20,000 molecular weight polysaccharide.

Table D, set forth below, discloses the advantageous use of the process of the invention to improve the properties of a membrane made from the acrylic fiber sold under the trade name Orlon by E. I. du Pont de Nemours & Co., Inc. A commercial Orlon knitting wool was used to facilitate formation of the polymer solution. Very large increases in solute retentivity are obtained at very moderate losses in membrane throughput. For example, the flux drops only by about one-half when the amount of solute TABLE B.—FORCED-RATE EVAPORATION
[Polymer 360/DMSO, acetone membranes]

| Casting solution composition | Membrane thickness (mils) | Water flux | Dextran-110 rejection | | | Dextran-20 rejection | | | Remarks |
|---|---|---|---|---|---|---|---|---|---|
| | | | Pressure (p.s.i.) | Flux | Rejection (percent) | Pressure (p.s.i.) | Flux | Rejection (percent) | |
| 15 g. Polymer 360, 55 cc. DMSO, 45 cc. acetone. | 3.6 | 211 | 10 | 40.6 | 89 | 10 | 21.1 | 82 | 2 sec. in oven at 90° C. |
| | | | 25 | 14.4 | 83 | 25 | 21.1 | 60 | |
| | | | | | | 50 | 27.2 | 6 | |
| Do | 6.2 | 106 | 10 | 10.6 | 96 | 10 | 17.6 | 92 | 10 sec. in oven at 90° C. |
| | | | 25 | 14.1 | 92 | 25 | 23.5 | 83 | |
| | | | 50 | 14.1 | 95 | 50 | 25.3 | 67 | |
| Do | | 0.0 | | | | | | | 30 sec. in oven at 90° C. |
| Do | 3.6 | 326 | 10 | 8.5 | 86 | | | | Control, no time in oven. |
| | | | 25 | 14.2 | 68 | | | | |
| | | | 50 | 20 | 52 | | | | |

Table C, set forth below, discloses further rejection improvements obtained by an evaporation step carried out at 180° C. for 10 seconds:

passed through the membrane drops from 74% to 46% at 25 p.s.i. operating pressure.

TABLE D

| Casting solution | Treatment | Water flux | Dextran 110 rejection | | |
|---|---|---|---|---|---|
| | | | Pressure, p.s.i. | Flux | Rejection, percent |
| 15 g. Orlon, 50 cc. DMSO, 50 cc. acetone. | None | 387 | 25 | 28.2 | 26 |
| | | | 50 | 28.2 | 31 |
| Do | 5 sec. at 100° C. | 160 | 10 | 17.7 | 61 |
| | | | 50 | 17.7 | 29 |
| Do | 5 sec. at 100° C. | 160 | 10 | 17.7 | 61 |
| | | | 50 | 17.7 | 29 |
| Do | 10 sec. at 180° C. | 106 | 10 | 14.1 | 58 |
| | | | 25 | 17.7 | 54 |
| | | | 50 | 21.2 | 50 |

Dextran 110 is a trade designation for a 110,000 molecular weight polysaccharide.

Table E, set forth below, indicates even more dramatically the advantages obtainable by use of the process of the invention wherein a film formed of a polysulfone polymer of the type sold under the trade designation P 1700 by Union Carbide Corporation is treated for 10 seconds at 150° C. before precipitating the membrane. Flux rates drop only about 40% but the amount of polysaccharide which can go through the membrane at 50 p.s.i.g. operating pressure drops from 100% to 15%.

TABLE E

| Casting solution | Treatment | Water flux | Rejection data for Dextran 110 | | |
|---|---|---|---|---|---|
| | | | Pressure (p.s.i.) | Flux | Rejection |
| 10 g. polysulfone, 60 cc. DMAC, 40 cc. acetone. | None (control) | 850 | 10 | 17.7 | 2 |
| | | | 25 | 35.2 | 0 |
| | | | 50 | 70.0 | 0 |
| Do | 10 sec. at 150° C | 525 | 10 | 14.1 | 79 |
| | | | 25 | 17.7 | 83 |
| | | | 50 | 24.8 | 85 |

The testing of polysaccharide solution concentrations was carried out by measuring the refractive indices of the solutions with a Brice-Phoenix differential refractometer.

What is claimed is:

1. In a process for making anisotropic membranes having a high water flux which comprises the steps of
   (1) providing a casting solution containing polymer dissolved in solvent
   (2) casting a film of said solution
   (3) preferentially contacting one side of said film with a liquid diluent characterized by a high degree of miscibility with said solvent and a sufficiently low degree of compatibility with said polymer to effect precipitation of the polymer, the improvement which comprises subjecting said one side, prior to said precipitation, to an evaporative step by exposing it to hot gas or air at a temperature in the range from 50° to 25° C. and below that at which the casting solution bubbles for a period from 5 to 60 seconds.

2. A process as claimed in claim 1 in which the gas or air is maintained at sub-atmospheric pressure.

3. A process as claimed in claim 1 in which the cast film is cooled to a temperature between 25° C. and the freezing point of the casting dope before carrying out said evaporative step.

4. A process as claimed in claim 1 in which the polymer is a polysulfone.

References Cited

UNITED STATES PATENTS

| | | | |
|---|---|---|---|
| 3,332,894 | 7/1967 | Cantor et al. | 264—41X |
| 3,439,074 | 4/1969 | Sharples et al. | 264—41 |

OTHER REFERENCES

U.S. Office of Saline Water, "Investigation and Preparation of Polymer Films to Improve the Separation of Water and Salts in Saline Water Conversion," Research and Development Progress Report No. 69, December 1962, pp. 41–42.

U.S. Office of Saline Water, "Research and Development on Reverse Osmosis Membrane Modules," Research and Development Progress Report No. 165, January 1966, pp. 1–4.

U.S. Office of Saline Water, "Second Report of Fabrication and Evaluation of New Ultrathin Reverse Osmosis Membranes," Research and Development Report No. 247, April 1967, pp. 46–47.

Saline Water Conversion Report for 1968, pp. 118–119.

PHILIP E. ANDERSON, Primary Examiner

U.S. Cl. X.R.

210—500; 260—2.5; 264—331, 345

PO-1050
(5/69)

UNITED STATES PATENT OFFICE
CERTIFICATE OF CORRECTION

Patent No. 3,567,810      Dated March 2, 1971

Inventor(s) Richard W. Baker

It is certified that error appears in the above-identified patent and that said Letters Patent are hereby corrected as shown below:

Column 1, line 58, "processes" is misspelled;

Column 3, line 5, "characteristic" should be plural;

Column 5, line 1, change "from" to --of--;

Column 5, line 32, change "evaporating" to --evaporative--;

Column 5, line 35, change "throughout" to --throughput--;

Column 5, Table B, under column "Dextran-110 rejectic Flux", change "40.6" to --10.6--;

Column 6, Table C, "88" should be --86--;

Column 6, Table C, first "76" should be --78--;

Column 6, Table D, delete the following line:

"Do......5 sec. at 100°C.....160   10   17.7   61
                                                 50   17.7   29"

Column 8, line 7, "comprises" is misspelled;

Column 8, line 10, change "25°C." to --250°C.--.

Signed and sealed this 17th day of August 1971.

(SEAL)
Attest:

EDWARD M. FLETCHER, JR.          WILLIAM E. SCHUYLER, JR.
Attesting Officer                    Commissioner of Patents